June 27, 1972  R. A. HUDSON  3,672,907
METHOD OF THERMALLY PROCESSING A COMESTIBLE PRODUCT
Filed Jan. 19, 1970
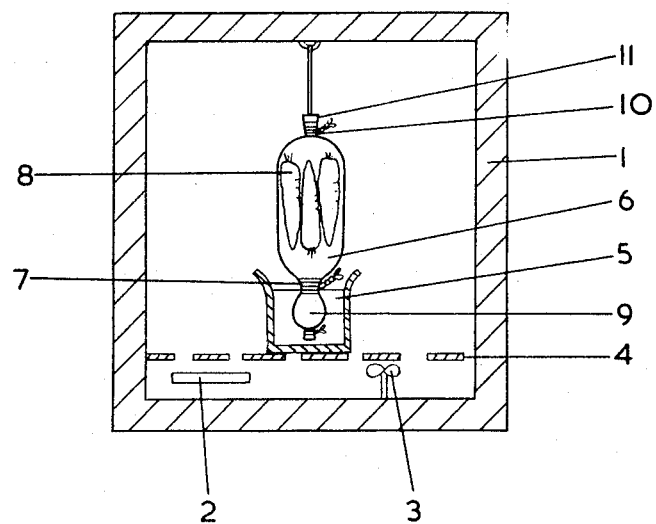
INVENTOR
RONALD AUGUSTUS HUDSON
BY Cushman, Darby & Cushman
ATTORNEYS 3,672,907
METHOD OF THERMALLY PROCESSING A COMESTIBLE PRODUCT
Ronald Augustus Hudson, Welwyn Garden City, England, assignor to Imperial Chemical Industries Limited, London, England
Filed Jan. 19, 1970, Ser. No. 4,013
Claims priority, application Great Britain, Jan. 30, 1969, 5,226/69
Int. Cl. A23l 3/10; A23b 1/00
U.S. Cl. 99—1    5 Claims

ABSTRACT OF THE DISCLOSURE

Packaging and thermally processing foods etc. by enclosing them with a small amount of water in a sealed flexible plastic container, separating the water into a portion of the container, and heating only the water, preferably by microwave or radio frequency heating, to process the product by steaming.

---

This invention relates to a method of packaging, and more particularly to a method for the packaging and thermal processing of foods and other products, in plastics containers.

It has previously been proposed to sterilize food products in flexible packages by conventional heating methods, such as by infra-red heating, immersion in hot liquids, and pressure cooking and sterilizing. Such methods suffer from the disadvantage that they are generally slow; they may also cause damage to the packaging material by the heat passing through it, and may require the presence within the package of large quantities of water to provide adequate heat transfer.

It has also been proposed to sterilize moisture-containing food products held within flexible plastics containers, by subjecting the product to the action of electromagnetic energy in the microwave range so as to heat it quickly to a temperature of about 100° C. This method has the advantage that it provides rapid heating which does not depend on the conduction of heat through the walls of the container. However, it has the disadvantage that local over-heating and therefore over-processing of the package contents tends to occur.

It is an object of the present invention to provide a new method by which foods and other products may be packed in flexible containers and thermally processed.

In accordance with the present invention, a method of packaging and thermally processing foods or other products comprises enclosing and sealing the product within a flexible plastics container with an amount of water insufficient for the container to be completely filled, holding the container so that at least a portion of the water is held separate from but in communication with the product, and heating the water so separated to a temperature and for a time sufficient to bring about the desired degree of processing of the product by steaming.

The water is preferably heated by subjecting it to the action of electromagnetic energy in the radio frequency or microwave range, while withholding the other contents of the package from the action thereof. It may, however, be heated by immersing the part of the package that contains the separated water in hot liquid, such as silicone oil, or a hot gas.

The amount of water is preferably kept to the minimum that is required to ensure a constant circulation of steam under the conditions of processing. The treatment is preferably carried out in a heated atmosphere, so that the steam will condense on the product in the package rather than on the walls of the package. The water may be separated from the product by applying a partial ligature to the package, sufficiently tight to prevent the enclosed product from passing through the neck, but sufficiently loose to provide a passageway for the steam. The product may, however, be held apart from the water by other means. For example, where radio frequency or microwave heating is used, the package may be locally constricted between blocks of low loss materials, such as polypropylene, to provide an enclosure for the water. Alternatively, the package may be shaped to provide a compartment for the water, communicating through a narrow neck with the interior of the remainder of the container. When processing has been completed, the container may if desired be sealed, for example by means of a clip capable of providing an air-tight seal, and the portion of the package that contains the water may then be removed and discarded.

The container must be formed of a plastics material at least the internal surface of which is capable of resisting steam at the maximum processing temperature, which will generally be above 100° C., with a superatmospheric pressure in the container, without softening or substantial stretching. Oriented, heat set films are particularly suitable, especially biaxially oriented heat set films of polypropylene or polyethylene terephthalate. Generally, the sterilized package will be required to have a good shelf life, requiring a high degree of impermeability to oxygen in the packaging material. When the oxygen permeability of the material itself is too high, as is generally the case with polyethylene terephthalate and polypropylene films, permeability may be reduced by providing a coating of a material highly impermeable to oxygen, such as an external coating of vinylidene chloride polymer or copolymer.

The package may be closed by heat sealing or other appropriate method, and any closure seals or seams in the container must be capable of withstanding the maximum pressure developed within the container during processing, or supported during processing to withstand such pressure. One type of container particularly suitable for use in the process is formed from a length of tubular film closed at its ends by sealing together the opposed inner surfaces, gathering each sealed end and encircling it with a clip or ligature disposed at least in part inwardly of the seal. The clip or ligature then protects the seal from strain from internal pressures developed in the package. A preferred form of such a container is that described in our copending application No. 35,333/67 and its cognate applications. These containers are closed by at least one bunched neck, with a ligature or other encircling closure applied to the bunched neck immediately below a thickened region thereof that is of greater cross-sectional area than the region encompassed by the encircling closure, and all capillaries leading through the bunched neck from inside the container to the atmosphere are sealed against egress of gas from the container. The container is preferably formed from a length of oriented tubular film of polyethylene terephthalate, closed at both ends in the manner described.

The preferred containers are capable of withstanding pressures considerably in excess of atmospheric pressure, and therefore allow rapid processing of the food or other contents when used for operating the method of the present invention. If containers are used which are not capable of withstanding pressures appreciably above atmospheric pressure, the seals may be supported during processing, or a counter pressure may be applied during processing, to allow higher temperatures to be used, by processing the packages in a pressure chamber.

By using the method of the present invention, the package contents may be rapidly processed, since the water may be rapidly brought to boiling point, without risk of local over-processing. The package contents may thus be rapidly sterilized and cooked or partially cooked to a desired degree. The method also allows advantage to be taken of the high impermeability to oxygen of vinylidene chloride polymers and copolymers, which may be used as external coatings on the containers; they are not resistant to moisture at elevated temperatures and are thus unsuitable for use in many of the conventional sterilizing and cooking methods.

One preferred form of the invention will now be described by way of example with reference to the accompanying drawing, which shows, partly in section, a package being processed by the method of the invention.

In this drawing: 1 is an oven, maintained at a desired temperature by the heater 2, and fan 3, which circulates hot air through the apertures in the base 4, of the oven. 5 is a bath of heated oil, suitably silicone oil. The package 6 is partially divided into two compartments by a loose ligature 7, the upper, larger compartment containing the product to be treated 8, and the lower compartment containing the water 9. The package is of the type described hereinbefore with reference to our copending application No. 35,333/67, closed at each end by a ligature 10, and thickened neck region 11. The oven is maintained at a desired temperature, and the package is held in the oven for a time sufficient to achieve the desired degree of processing.

In one particular example of the use of the method just described, the container was formed from a 9 inch length of biaxially oriented lay-flat tubing of polyethylene terephthalate, having a wall thickness of 0.0008 inch (0.020 mm.) and a flat width of 2½ inches (6.35 cms.), and having a 0.00015 inch (0.004 mm.) thick external coating of vinylidene chloride copolymer. The container was closed at one end by folding over a narrow hem and forming a heat seal ⅛ inch (3.2 mm.) wide between the four layers of film along the whole length of the folded-over portion to form the thickened neck region 11, and the ligature was applied immediately adjacent to the seal. A ligature of the same wire was loosely applied at 7. The upper compartment 6, was then filled with peeled, uncooked carrots, and 5 ccs. of water were poured into the containers, almost filling the lower compartment 9. Excess air was expelled from the container, and the top end was closed in the same manner as the bottom end. The package was placed in the oven as shown in the drawing, with the lower compartment immersed in the oil, the oven oil bath being maintained at a temperature of 12° C. After 10 minutes the steam pressure in the pack had risen to an equilibrium level of about 20 p.s.i. and it could be seen that reflux conditions had been established, water being evaporated from the reservoir and the steam condensing on the carrots and returning by gravity to the reservoir. These conditions were maintained for a further 15 minutes for the carrots to become cooked and sterilized. The pack was then cooled in the same vertical position, and a clip capable of providing an air-tight seal was applied immediately above the ligature 7. The compartment 9 of the container together with the ligature was cut off and discarded.

When the package was opened, the carrots were found to be uniformly cooked and of good flavour.

Various modifications may be made in the method particularly described. For example, instead of using containers closed at their ends by pressure resistant seals, as described, containers closed by other means, such as by flat seals, may be used, provided that the seals are supported during the thermal processing of the pack, if high pressures are to be reached within the packs. For example, clamps may be placed upon the seals, or placed inwardly of the seals, the clamps extending continuously along the whole length of the seals to protect them from the pressure within the packs. The packs may then be removed from the clamps after they have cooled and the internal pressure has fallen.

I claim:
1. A method of thermally processing a comestible product that comprises enclosing and sealing the product and a quantity of water in a plastic-film container formed into two compartments the first of which encloses the product and the second the quantity of water, the first and second compartments being in communication through at least one channel that is insufficiently large for the product to pass therethrough, holding the filled container in a position such that the liquid water remains isolated in the second compartment from the product in the first compartment, and subjecting only the water to electromagnetic energy within the microwave range to heat it to a temperature to cause steaming of the water and allowing the steam to contact the product for a time sufficient to heat or cook the product by said steaming.

2. A method as claimed in claim 1 in which the container is of oriented, heat set plastics film.

3. A method as claimed in claim 2 in which the film is biaxially oriented, heat-set film of polyethylene terephthalate.

4. A method as claimed in claim 2 in which the film is biaxially oriented, heat-set film of polypropylene.

5. A method as claimed in claim 1 in which the container is formed from a length of tubular film closed at its ends by a seal between the opposed inner surfaces, the sealed ends each being gathered and encircled with a clip or ligature disposed at least in part inwardly of the seal.

References Cited
UNITED STATES PATENTS

| | | | |
|---|---|---|---|
| 2,380,134 | 7/1945 | Waters | 99—171 |
| 2,995,418 | 8/1961 | Müller | 99—214 |
| 3,261,140 | 7/1966 | Long | 53—22 |
| 3,293,048 | 12/1966 | Kitterman | 99—171 |
| 3,394,388 | 7/1968 | Kuchlin | 99—171 |
| 3,398,251 | 8/1968 | Jeppson | 99—221 |

WILBUR L. BASCOMB, Jr., Primary Examiner

M. G. MULLEN, Assistant Examiner

U.S. Cl. X.R.

99—100, 103, 107; 53—25; 219—10.55